US006406251B1

(12) United States Patent
Vauthier

(10) Patent No.: US 6,406,251 B1
(45) Date of Patent: Jun. 18, 2002

(54) BI-DIRECTIONAL HYDROTURBINE ASSEMBLY FOR TIDAL DEPLOYMENT

(76) Inventor: Philippe Vauthier, P.O. Box 3124, Annapolis, MD (US) 21403

( * ) Notice: Subject to any disclaimer, the term of this patent is extended or adjusted under 35 U.S.C. 154(b) by 0 days.

(21) Appl. No.: 09/695,737

(22) Filed: Oct. 24, 2000

Related U.S. Application Data

(63) Continuation of application No. 09/320,204, filed on May 26, 1999, now Pat. No. 6,139,255.

(51) Int. Cl.$^7$ .................................................. B63H 1/34
(52) U.S. Cl. ............................ 415/7; 415/3.1; 415/906; 416/85; 60/398
(58) Field of Search ........................ 415/3.1, 4.3, 4.5, 415/7, 906, 908, 146, 147; 416/85, 86; 60/500, 503, 598, 497; 290/53

(56) References Cited

U.S. PATENT DOCUMENTS

| 4,511,808 A | * | 4/1985 | Jost | 415/7 |
|---|---|---|---|---|
| 4,519,742 A | * | 5/1985 | Van Buytene | 415/7 |
| 4,598,210 A | * | 7/1986 | Biscomb | 415/7 |
| 4,722,665 A | * | 2/1988 | Tyson | 416/85 |
| 4,748,808 A | * | 6/1988 | Hill | 415/7 |
| 4,843,249 A | * | 6/1989 | Bussiere | 290/53 |
| 4,849,647 A | * | 7/1989 | McKenzie | 290/54 |
| 5,040,948 A | * | 8/1991 | Harburg | 416/85 |
| 5,051,059 A | * | 9/1991 | Rademacher | 415/3.1 |
| 5,324,988 A | * | 6/1994 | Newman | 415/7 |
| 5,471,098 A | * | 11/1995 | Asay | 290/53 |
| 6,139,255 A | * | 10/2000 | Vauthier | 415/7 |

FOREIGN PATENT DOCUMENTS

FR          2445451        *  8/1980  ................. 415/7

OTHER PUBLICATIONS

U.S. Department of Energy, Idaho Field Office DOE Hydropower Program Engineering Research and Development Summary Report, DOE/ID–10376, 1977–1991.*

* cited by examiner

Primary Examiner—F. Daniel Lopez
Assistant Examiner—Richard Woo
(74) Attorney, Agent, or Firm—Wm. Brook Lafferty; Troutman Sanders LLP

(57) ABSTRACT

A bi-directional hydroturbine assembly for tidal deployment. A hydroturbine is carried by a cylindrical shroud. Rotation of the hydroturbine blades by tidal currents drives rotation of the shaft, thereby converting kinetic energy into electrical energy. Stabilizer fins extend radially outwardly from the shroud along substantially the entire length of the shroud. Each corner of each stabilizer fin carries a pivot point for connection of pivoting deflectors between adjacent pivot points of adjacent stabilizer fins at the same end of the shroud. Pivoting deflectors are positioned between pivot points about the periphery of each end of the shroud and are biased such that tidal current flow in a first direction urges pivoting deflectors at the first end of the shroud into a non-deflective position, while urging pivoting deflectors at the second end of the shroud into a deflective position, and vice versa for tidal current flow in the opposite direction.

12 Claims, 3 Drawing Sheets

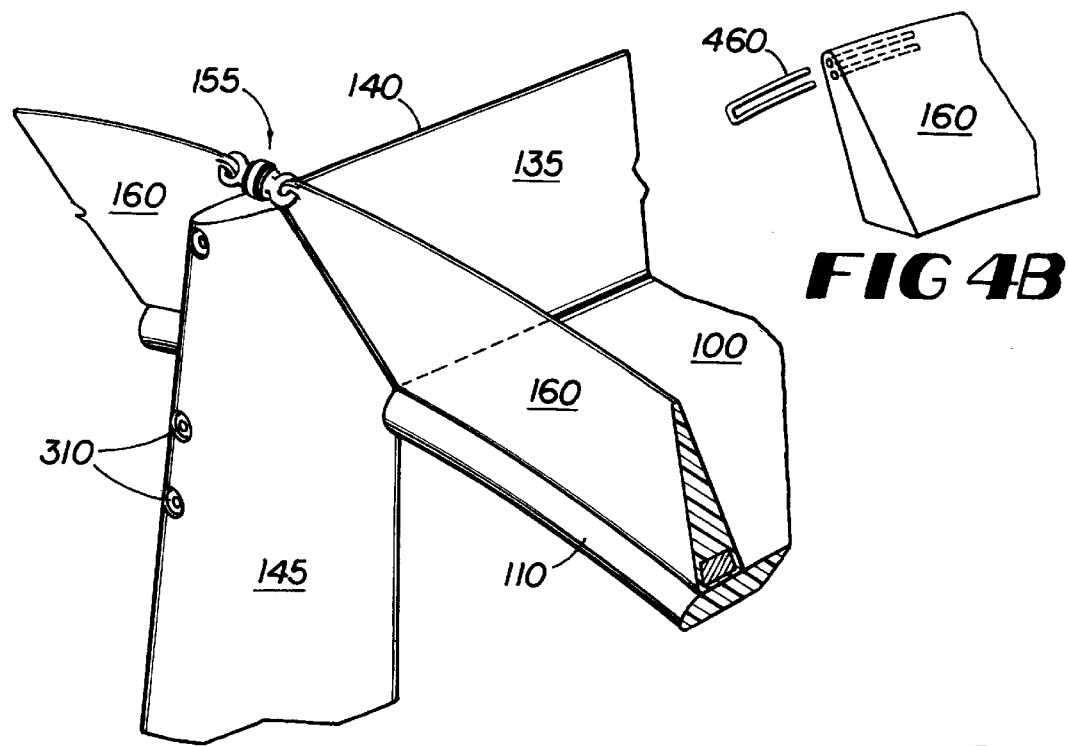
FIG 4B
FIG 3
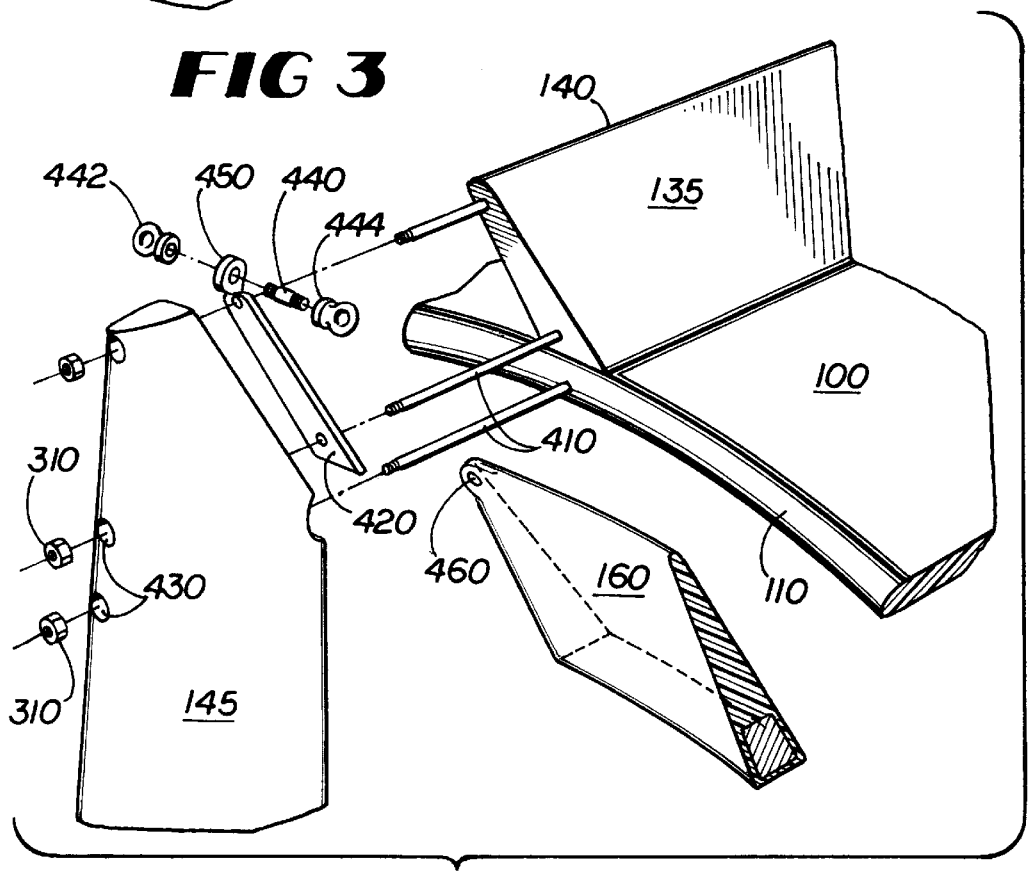
FIG 4A

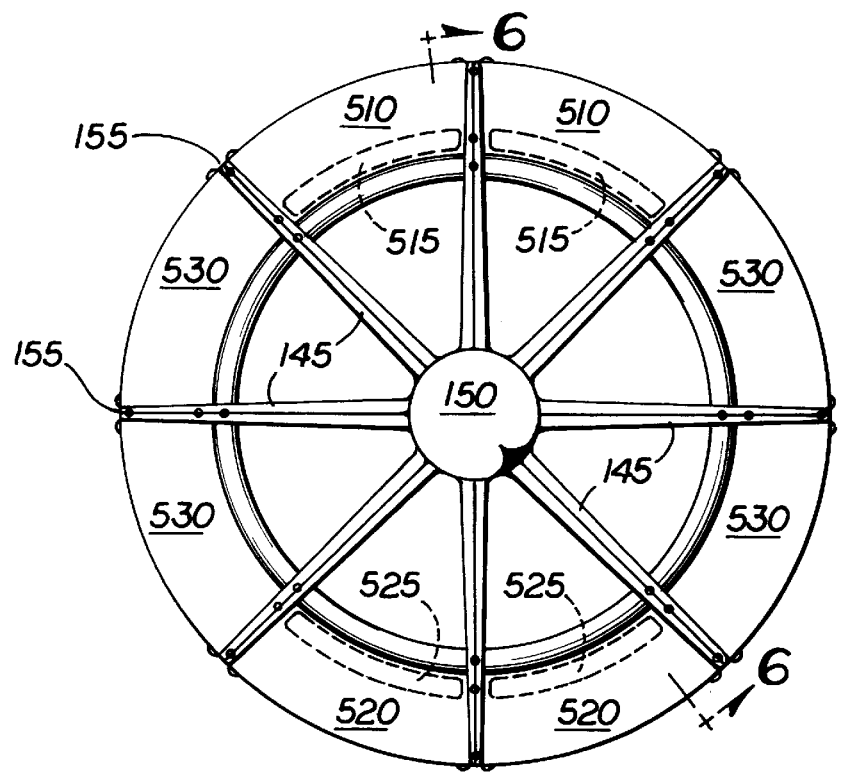
FIG 5
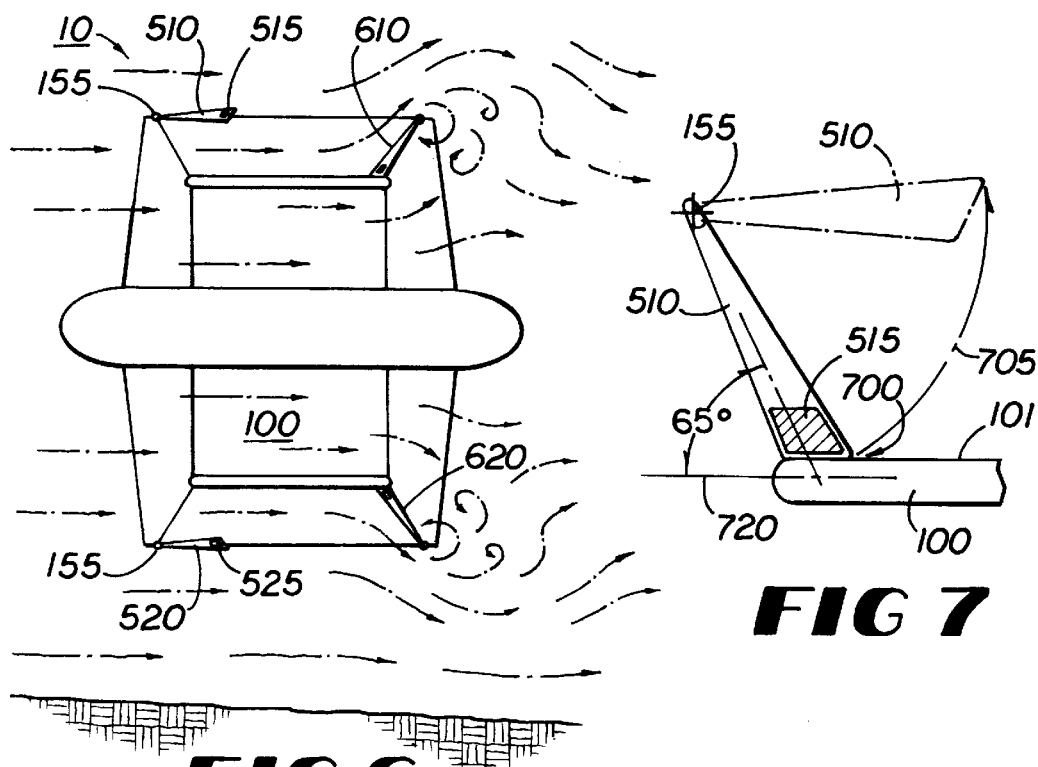
FIG 6
FIG 7

BI-DIRECTIONAL HYDROTURBINE ASSEMBLY FOR TIDAL DEPLOYMENT

This application is a continuation of Ser. No. 09/320,204, filed May 26, 1999 U.S. Pat. No. 6,139,255 entitled "Bi-Directional Hydroturbine Assembly for Tidal Deployment."

BACKGROUND

For generations, man has sought ways to harness natural kinetic resources to meet ever increasing electrical power generation needs. Notably, the implementation of large scale inland hydroelectric facilities has been amply demonstrated to be a successful method of electrical power generation. This success notwithstanding, man has yet to successfully and economically harness the natural kinetic energy contained within this planet's greatest aquatic resource—its oceans.

Successful inland hydroelectric generation has two basic requirements. First, kinetic energy must exist within a body of water. In the case of a moving flow of water such as a river, the movement of the water indicates the presence of kinetic energy. Historically, the amount of kinetic energy present in a moving flow of water has been increased by man-made structures such as dams. By accumulating a mass of water at one elevation, then releasing it to fall to a lower elevation, the extractable kinetic energy within the water flow is increased dramatically.

Apart from such man-made facilities, recent groundbreaking innovations have been made which allow extraction of kinetic energy from naturally flowing bodies of water. These innovations, which do not require large-scale construction, have opened the doors of hydroelectric generation to myriad people and places where traditional facilities are either unwanted or unfeasible.

The second basic requirement for inland hydroelectric generation is that the water must flow in one basic direction. Because inland water flow is dictated by the earth's constant gravitational pull, inland bodies of water respond to the earth's gravitational pull by flowing in a single general direction, dictated by topography. Hydroturbines have been developed for placement in such uni-directional flow which utilize hydrodynamic principles to maximize energy extraction efficiency.

In stark contrast, extraction of kinetic energy from a tidal flow poses a drastically different paradigm. Most significantly, the direction of tidal flow is largely dictated by the position of the earth with respect to other celestial bodies. As the earth rotates about its axis, as the moon circles the earth, and as the earth and moon rotate in tandem about the Sun, extraplanetary gravitational forces move oceanic tides toward shore twice each day and away from shore twice each day.

Implementation of inland-type hydroelectric generation methods and systems in such a tidal environment are impractical and inefficient. Large scale dams and other construction-intensive facilities cannot be affordably built, operated or maintained offshore. Additionally, ecological ramifications of such a project would be resoundingly negative.

For different reasons, even the newest and most innovative methods and systems for extracting kinetic energy from a natural flow of water cannot be successfully implemented offshore because of the lack of a unidirectional water flow. To be efficient, hydroturbines placed in a naturally flowing body of water rely on a continuous, unidirectional flow to create enough electrical energy to justify purchase, placement and maintenance of the devices. Additionally, such devices are designed to be hydrodynamically efficient in only a single direction of water flow. To place such devices in a body of water in which the direction of flow changes several times each 24 hour cycle substantially reduces the cost-effectiveness of this form of power generation, not to mention the lack of continuous or semi-continuous power generation.

Numerous attempts to solve this dilemma have been propounded. Most notably, a conventional hydroturbine assembly has been pivotally mounted on a structure secured to the floor of the ocean, a pier, bridge or other stationary platform. Such devices are mechanically and periodically rotated 180 degrees to face the changing direction of tidal current. While taking advantage of the power generation capability of tidal flow in both the inbound and ebb directions, these devices have failed to yield commercially feasible electrical power for several reasons. First, they require a mechanical apparatus to physically turn the hydroturbine. In salt-laden oceanic environment, devices with more mechanical parts require more maintenance and will be more costly to operate. Ultimately, devices requiring more maintenance will have less operating efficiency and a corresponding higher energy cost. Second, it is unavoidable that the pivoting movement of the hydroturbine will place weight on a load-bearing pivot point on the support structure. While deployment in saltwater provides a greater buoyancy for the device than if deployed on land or in fresh water, the point of mechanical interaction of the hydroturbine and its support structure is yet another corrosion-vulnerable location requiring, over time, expensive maintenance or replacement. Lastly, constant twisting of a slip ring to carry power to shore creates increased expense and results in less reliability than a direct, fixed interconnection.

Accordingly, a need exists for a hydroelectric turbine for tidal deployment which can utilize bi-directional tidal currents to produce electrical energy. A further need exists for bi-directional hydroturbine with does not require structural rotation or another complex mechanical apparatus to utilize tidal currents flowing in opposite directions. Yet another need exists for a bi-directional hydroturbine for deployment in tidal currents which, in addition to meeting other needs, implements recent advances in hydrodynamics to facilitate efficient conversion of kinetic energy to electrical energy.

SUMMARY OF THE INVENTION

The following invention is a bi-directional hydroturbine assembly for tidal deployment, including a cylindrical hydroturbine shroud having first and second ends. The shroud is axially aligned with both an inflow and an ebb of an ocean tide.

A hydroturbine is carried by the shroud and is connected to a hydroturbine shaft. Rotation of the hydroturbine blades by moving water drives rotation of the shaft, thereby converting kinetic energy into electrical energy in a well known manner.

Importantly, stabilizer fins extend radially outwardly from the hydroturbine shroud along substantially the entire length of the shroud. Each corner of each stabilizer fin carries a pivot point for connection of pivoting deflectors between adjacent pivot points of adjacent stabilizer fins at the same end of the shroud.

The pivoting deflectors are positioned about the periphery of each end of the hydroturbine shroud and are biased such that tidal current flow in a first direction urges pivoting deflectors at the first end of the shroud into a non-deflective position, while urging pivoting deflectors at the second end of the shroud into a deflective position, such as the position of an augmentor ring, which device is well known in the art. On reversal of the direction of the current, the pivoting deflectors at the second end of the shroud are urged into a non-deflective position, while the pivoting deflectors at the first end are urged into a deflective position.

Accordingly, it is an object of the present invention to provide a hydroelectric turbine for tidal deployment which can utilize bi-directional tidal currents to produce electrical energy. Yet another object of the present invention is to provide a bi-directional hydroturbine with does not require structural rotation or another complex mechanical apparatus to utilize tidal currents flowing in opposite directions. A further object of the present invention is to provide a bi-directional hydroturbine for deployment in tidal currents which, in addition to meeting other needs, implements recent advances in hydrodynamics to facilitate efficient conversion of kinetic energy to electrical energy.

BRIEF DESCRIPTION OF THE DRAWINGS

FIG. 3 is a detailed view of the pivot point attachment of the pivoting deflectors of the present invention.

FIG. 4A is an exploded view of the pivot point attachment of the pivoting deflectors of the present invention.

FIG. 4B is an exploded view of an exemplary hinge loop bracket and its interconnection to a pivoting deflector.

FIG. 5 is a rear view of an embodiment of the present invention.

FIG. 6 is a side view of an embodiment of the present invention in an exemplary operating environment depicting a surrounding flow of water.

FIG. 7 is a detailed view of the geometry and operation of a pivoting deflector.

DETAILED DESCRIPTION

The invention is not to be limited by what has been particularly shown and described, except as indicated by the appended claims.

Figure 1:
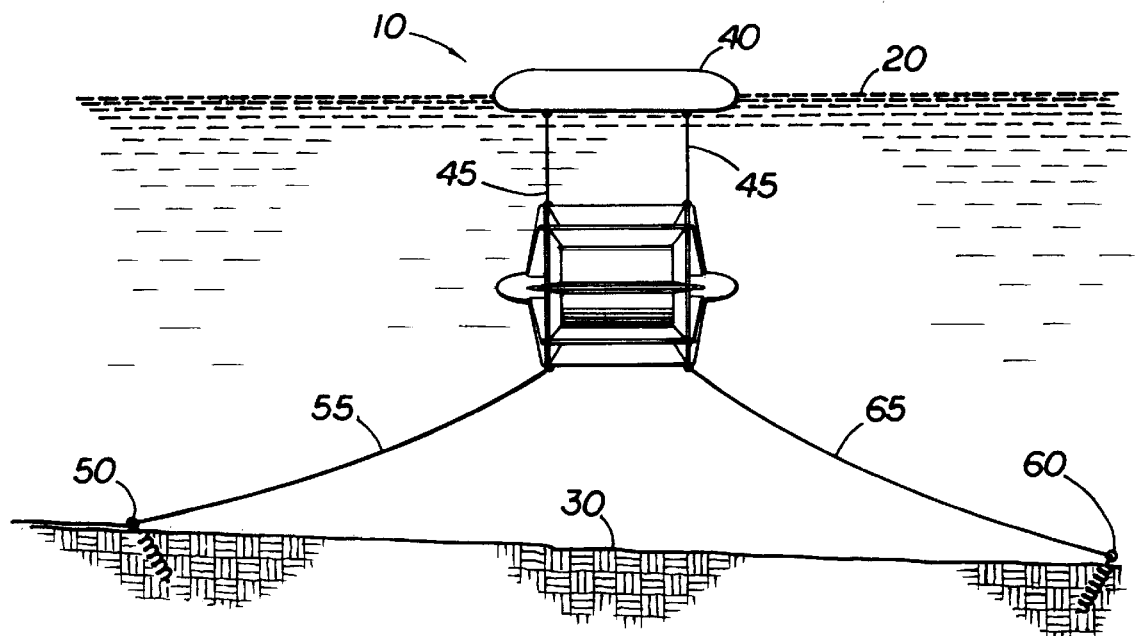
FIG. 1 depicts an exemplary environment for exemplary operation of the present invention.

FIG. 1 depicts an exemplary environment for exemplary operation of the present invention. More specifically, FIG. 1 depicts a preferred system of deployment for a bi-directional turbine assembly 10, in accordance with the present invention. In essence, the bi-directional turbine assembly 10 is maintained in a desired position within a tidal flow by a float support 40, first anchor 50 and second anchor 60.

Float support 40 is a buoyant member constructed of any of a wide variety of buoyant materials. Ideally, the float support 40 would be constructed with a view toward durability, given the possibility that it may be accidentally struck by boats or other objects traveling along the water surface 20. Additionally, materials used to construct the float support should be selected from a group of materials known for their resilience to the corrosive nature of sea water.

Float support 40 supports the bi-directional turbine assembly 10 by at least one float support cable 45 extending between the float support 40 and the bi-directional turbine assembly 10. The exact positioning and number of float support cables 45 may vary with the specific design of the turbine assembly 10 and deployment conditions. In the depicted embodiment, in which the turbine assembly 10 is a generally elongated member, the depicted configuration of float support cables 45 may be most desirable. Other embodiments of turbine assembly 10 are readily envisioned wherein different positioning of float support cables 45 would be preferable. In any event, the float support cables 45 must provide stable support for the turbine assembly 10, in addition to a reliable support connection between the turbine assembly 10 and the float support 40.

The lateral position of the hydroturbine assembly 10 is maintained by a first anchor 50 and a second anchor 60. Each of these anchors may be an anchor within the well-known and widely understood meaning of the term, or may represent a fixed connection to a stationary structure. The first anchor 50 is attached to the hydroturbine assembly 10 via first anchor cable 55, and the second anchor 60 is connected to the turbine assembly 10 by second anchor cable 65. Importantly, one or more power or support cables may be interconnected between the hydroturbine 10 and an external source or receiver along an anchor cable. Ideally, first anchor 50 and second anchor 60 should be positioned such that there is enough slack in the respective first anchor cable 55 and second anchor cable 65 to allow a limited range of vertical movement of the hydroturbine assembly 10 with respect to the ocean floor 30 as different tide levels exist. It is also expected that in either an incoming tidal flow or a tidal current ebb, the hydroturbine assembly 10 may be pushed, to some small degree, in the direction of water flow. Such movement is acceptable, although the first anchor 50 and second anchor 60 should be positioned such that this flow conforming movement is relatively small.

Optionally, the system for deployment for the present invention may include a mechanism for adjusting the lengths of the float support cables 45 and/or the respective first and second anchor cables 55, 65 to refine the position of the hydroturbine assembly 10 with respect to either the ocean floor 30 or the water surface 20. Such mechanisms for withdrawing and extending cables are well known to those skilled in the art.

Figure 2:
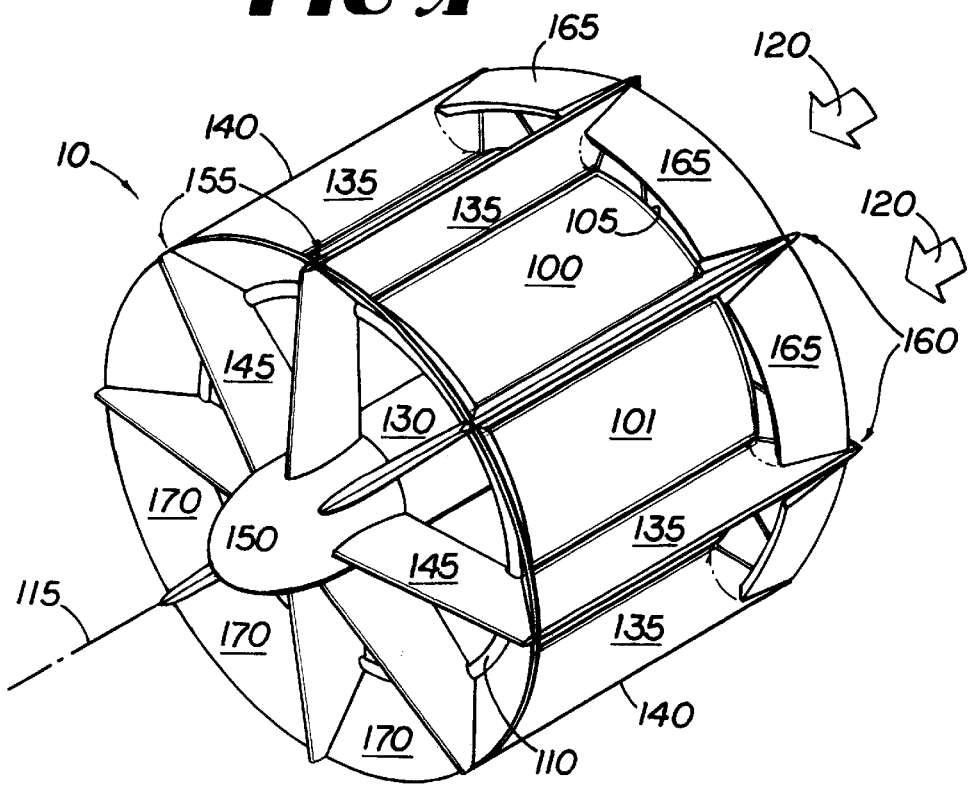
FIG. 2 is a perspective view of an embodiment of the present invention.

Referring now to FIG. 2, a perspective view of the hydroturbine assembly 10 is depicted. The hydroturbine assembly 10 comprises a cylindrical hydroturbine shroud 100 having a first shroud end 105 and a second shroud end 110, the hydroturbine shroud 100 being positioned about a central axis 115. In deployment, the central axis 115 is generally directionally concomitant with either an incoming tidal flow 120 or a tidal ebb, which is not shown but is essentially the opposite of incoming tidal flow 120.

The hydroturbine shroud 100 has an outer surface 101 and an inner surface (not shown). The inner surface defines a shroud void, which shroud void rotatably carries a hydroturbine 130. By rotation of the hydroturbine 130, rotation of a workingly interconnected hydroturbine shaft (not shown) is driven, thereby converting kinetic energy into electrical energy in a well-known manner.

A plurality of stabilizer fins 135 are carried by the outer surface 101 of the hydroturbine shroud 100 about the periphery of the hydroturbine shroud 100. Each of the plurality of stabilizer fins 135 extends generally radially outwardly from the outer surface 101 and each extends generally along the hydroturbine turbine shroud 100 from the first shroud end 105 to the second shroud end 110. Each of the plurality of stabilizer fins 135 has a stabilizer fin edge 140 generally parallel to the central axis 115 of the hydroturbine assembly 110.

The hydroturbine assembly 10 carries the hydroturbine 130 within the void of the hydroturbine shroud 100 by a plurality of first end struts (not shown) and second end struts 145. Referring to the depicted second end struts 145 and understanding that the arrangement of first end struts on the opposite side of the hydroturbine assembly 10 is the same as the visible assembly at the second end of the hydroturbine assembly 10, the second end struts 145 securably interconnect each respective stabilizer fin 135 to an axially centered hub cap 150. In a preferred embodiment of the present invention, there is a one-to-one correlation between struts and the respective stabilizer fins 135, such that strut end such as second end struts 145 interconnect with stabilizer fins 135 proximate to the second shroud end 110. The interconnection of the second end struts 145 and stabilizer fins 135 locate, at a point remote from the hydroturbine shroud 100 a plurality of second end pivot points 155, which second end pivot points 155 will be discussed in greater detail with reference to a later figure. It is understood that the arrangement of stabilizer fins, end struts and pivot points as depicted with reference to the second end of the hydroturbine assembly 10 are identically applicable to the first end of the hydroturbine assembly 10.

Importantly, pivoting deflectors are connected between successive pivot points on respective first and second ends of the hydroturbine assembly 10. More specifically, in referring to the first end of the hydroturbine assembly 10, first pivoting deflectors 165 are interconnected between successive first pivot points 160 about the entire periphery of the hydroturbine assembly 10. Similarly, second end pivoting deflectors 170 are pivotably connected between successive second pivot points 155 about the entire periphery of the hydroturbine assembly 10. As will be described in great detail with respect to a later figure, the function of the pivoting deflectors is critical to implementation of the present invention in that they provide proper hydrodynamic configuration for the hydroturbine assembly 10 during either an incoming tidal flow 120 or a tidal ebb (not shown).

Importantly, a so-called "trash rack" (not shown) may be affixed to either or both ends of the hydroturbine 10 in such a fashion as to prevent foreign objects from striking or otherwise interfering with the functionality of the hydroturbine 10. Such implementation of trash racks are well known in the art.

Referring now to FIG. 3, a close-up view of a representative interconnection between a stabilizer fin 135, a second end strut 145, a second end pivot point 155 and a second end pivoting deflector 160 is shown. More precisely, a second end strut 145 is secured to a stabilizer fin 135 via a secure screw attachment of strut nuts 310 to screw posts (not shown) extending from and fixedly anchored to a stabilizer fin 135. At a remote end of the second end strut 145 proximate to the stabilizer fin edge 140 is a second end pivot point 155. As can be seen with reference to FIG. 3, second end pivot point 155 provides a pivotal interconnection for two respective second end pivoting deflectors 160.

FIG. 4A is an exploded view of the second end pivot point 155 and related members. As previously shown and described, stabilizer fin 135 extends generally radially outwardly from hydroturbine shroud 100 from a point proximate to the first shroud end 105 (depicted in FIG. 2) to a point proximate the second shroud end 110. In a preferred embodiment of the present invention, screw posts 410 are fixedly secured within stabilizer fin 135 and extend along a line generally parallel with the central axis 115 of the hydroturbine shroud 100. Although a particular arrangement and number of screw posts 410 is depicted in FIG. 4A, this number and arrangement is arbitrary, so long as the later described attachment of other components is accomplished in a secure fashion. Pivot bracket 420 is sized to slide over screw posts 410 and against the portion of the stabilizer fin 135 from which the screw posts 410 eminate. Thereafter, second end strut 145 similarly slidably receives screw posts 410 until the second end strut 145 abuts with the pivot bracket 420.

At the point at which the pivot bracket 420 is in pressed engagement with the stabilizer fin 135 and the second end strut 145 is in pressed engagement with the pivot bracket 420, portions of the screw posts 410 will extend through strut holes in the second strut end 145. Secure attachment of the pivot bracket 420 and second end strut 145 to the stabilizer fin 135 (and the hydroturbine shroud 100) is accomplished by fixed attachment of screw nuts 310 to the distal ends of the screw posts 410.

Assembly of the second pivot point 155 continues with insertion of a threaded member 440 through a pivot loop 450 in the pivot bracket 420. The threaded member 440 should rotate about its longitudinal axis freely and, furthermore, may carry, on a respective first end and second end, a first threaded eyelet 442 and a second threaded eyelet 444. A preferred method of attachment of the respective first and second eyelets 442, 444 to the threaded member 440 is by a conventional threaded screw-type arrangement. Nonetheless, any method of affixing the respective first and second eyelet members 442, 444 to the threaded member 440 will be suitable so long as the attachment is secure.

Importantly, attachment of second end pivoting deflectors 160 to the second pivot point 155 is accomplished by attachment of a hinge loop bracket 460 to each pivot end of each second end pivoting deflector 160. In other words, each second end pivoting deflector 160 will carry a hinge loop bracket 460 at adjacent corners remote from the second shroud end 110. The hinge loop brackets 460 may be integrally molded with the second end pivoting deflectors 160, may be screwed in, welded or fixed in any other such manner which facilitates reliable connection between the hinge loop bracket 460 and the second end pivoting deflector 160. FIG. 4A depicts, for instance, an integrally molded hinge loop bracket 460, while FIG. 4B depicts an embodiment wherein the hinge loop bracket 460 is formed in a "hairpin" configuration, the opposite linear ends of the "hairpin" hinge loop bracket 460 being forcibly and securely inserted into corresponding receptacles within a pivoting deflector 160. Regardless of the specific configuration of the hinge loop bracket 460, it is then attached to a respective first threaded eyelet 442 or second threaded eyelet 444 by well known means.

Turning now to FIG. 5, a rear elevational view of the second end of the hydroturbine assembly 10 is shown. More particularly, hub cap 150 is positioned at the center of the hydroturbine assembly 10, and second end struts 145 radiate radially outwardly therefrom. At the end of the second end struts 145 are second end pivot points 155, discussed in detail with reference to FIG. 4A. Between adjacent pivot points about the periphery of the hydroturbine assembly 10 are positioned a plurality of second end pivoting deflectors 170, shown more clearly in FIG. 2. It is important to here note that in previous descriptions and illustrations of the pivoting deflector such as second end pivoting deflectors 170 and first end pivoting deflectors 165, all deflectors around the periphery of a particular first or second end of the hydroturbine assembly 10 were referred to generically. FIG. 5 specifically illustrates differences between certain pivoting deflectors, focusing as an example on those positioned at the second end of the hydroturbine assembly 10. It should be understood and appreciated that the first end pivoting deflectors 165 will have the same characteristics as are described with reference to the second end pivoting deflectors 170.

The depiction of the second end of the hydroturbine assembly 10 illustrated in FIG. 5 is representative of either a "slack tide" configuration or a configuration in which the tidal current is approaching the hydroturbine assembly 10 from a direction approximate to the first end of the hydroturbine assembly 10. For purposes herein, "slack tide" refers to the times in the tidal cycle in which there is neither an incoming or ebb tide. Essentially, the rear elevational view of FIG. 5 depicts the configuration also illustrated in FIG. 2. This is especially significant when considering the system for biasing second end pivoting deflectors 170 against the outer surface 101 of the hydroturbine shroud 100 to provide the desired hydrodynamic affect.

The system for biasing is based on dividing pivoting deflectors such as second end pivoting deflectors 170 into groups including pivoting deflectors positioned proximate to the top of the hydroturbine assembly, pivoting deflectors positioned proximate to the bottom of the hydroturbine assembly 10 and pivoting deflectors positioned on the sides of the hydroturbine assembly 10. When referring to the "top", "bottom" and "sides" of the hydroturbine assembly, it is understood that these designations are derived from the orientation of the hydroturbine assembly 10 in the water, particularly with respect to the surfaces of the body of water in which the hydroturbine is deployed. For instance, the "bottom" of the hydroturbine assembly 10 is the point on the hydroturbine assembly 10 closest to the ocean floor 30, while the "top" of the hydroturbine assembly 10 is the portion of the hydroturbine assembly 10 closest to the water surface 20.

Returning to discussion of the differences between what have previously generically been described as second end pivoting deflectors 170, the pivoting deflectors about the periphery of the second end of the hydroturbine assembly 10 differ from each other in that pivoting deflectors proximate to the top of the hydroturbine assembly 10 (referred to here as second end top pivoting deflectors 510) each contain top deflector ballasts 515 integrally formed therein. The purpose of the top deflector ballasts 515 within the second end top pivoting deflectors 510 is to maintain the second end top pivoting deflectors 510 in an abutted position against the outer surface 101 of the hydroturbine shroud 100 during certain conditions as depicted in both FIG. 5 and FIG. 2. Similarly, because it is desirable to maintain the second end bottom pivoting deflectors 520 in a similarly abutted position against the outer surface 101 of the hydroturbine shroud 100, each second end bottom pivoting deflector 520 carries an integrally formed bottom deflector float 525, which bottom deflector float 525 lifts and maintains each second end bottom pivoting reflector 520 in its abutted position.

For pivoting deflectors which are not positioned on either the top or bottom of the hydroturbine assembly 10, no ballasting or float incorporation is required. In essence, all second end side pivoting deflectors 530 are neutrally buoyant.

In the depicted embodiment, a total of eight second end pivoting deflectors 170 (generally) are shown. It is specifically contemplated, however, that any number of pivoting deflectors may be used, though a preference exists for at least a total of six pivoting deflectors on any given end of the hydroturbine assembly 10. With that preferred minimum in mind, the maximum number of pivoting deflectors which can be placed about the periphery of the hydroturbine assembly 10 is limited only by practicality.

Referring now to FIG. 6, a simplistic view of the principle concept of the present invention is depicted in a tidal ebb situation. Specifically, the tidal ebb is approaching a deployed hydroturbine assembly 10 from its second end. Each of the second end pivoting deflectors has been urged by the force of the tidal ebb into non-deflective positions. Specifically, second top end pivoting deflectors 510 have been moved about second end pivot points 155 into a position generally aligned with the direction of flow of the tidal ebb. Similarly, both the second and bottom pivoting deflectors 520 and second end side pivoting deflectors 530 have moved into similar non-deflective positions generally parallel to the hydroturbine shroud 100. Movement of the second end pivoting deflectors 170 into non-deflective positions allows the tidal ebb to pass over the hydroturbine shroud 100 as if the second end pivoting deflectors did not exist. This arrangement is very similar to a conventional hydroturbine assembly designed, constructed and deployed in a body of water flowing in one direction only.

Because the flow of the tidal ebb approaches the hydroturbine assembly from a direction approximate to the second end of the hydroturbine assembly 10, the first end pivoting deflectors are maintained in the same position in which they were initially biased by virtue of their ballast and float characteristics. More specifically, the force of the tidal ebb maintains the abutted relationship between first end top pivoting deflectors 610, first end bottom pivoting deflector 620 and first end side pivoting deflector (not shown, identical to 530 in FIG. 5) against the outer surface 101 of the hydroturbine shroud 100 in the hydroturbine assembly 10. By maintaining the respective first pivoting deflectors in this position, the flow of water is deflected from around the hydroturbine shroud 100 in a manner so as to create a venturi effect at the "backside" of the hydroturbine assembly 10. For reference, the backside of the hydroturbine assembly 10 during the tidal ebb actually has been previously referred to as the first end of the hydroturbine assembly 10. By creation of such an effect on the backside of the hydroturbine assembly 10, the flow of water through the hydroturbine assembly 10 is accelerated significantly and the amount of the electrical power derived from the converted kinetic energy of the water flow is correspondingly increased, as is well known to those skilled in the art.

FIG. 7 depicts a detail view of the functionality and geometry of the pivoting deflectors and the hydroturbine shroud 100. Specifically shown is a second end top pivoting deflector 510 in an abutted position with the outer surface 101 of the hydroturbine shroud 100. The second end top pivoting deflector 510 pivots through a limited range about a second end pivot point 155, as generally shown by rotation arc 705. From the depicted abutted position, the second end top pivoting deflector 510 may only pivot in a counter-clockwise direction, and will normally only pivot to a position in which the center line 720 of the second end top pivoting deflector 510 is generally parallel to both the hydroturbine shroud 100 and the flow of the water. This position is referred to as the "non-deflective" position. In the event of a flow of water from an opposing direction, the second end top pivoting deflector 510 will rotate in a clockwise direction until the point on the second end top pivoting deflector opposite the connection to the second end pivot point 155 abuts the outer surface 101 of the hydroturbine shroud 100 at 700. Importantly, at this point of abutment, the arc of inclination of the second end top pivoting deflector 510 and the hydroturbine shroud is approximately 65 degrees. Although other inclination angles substantially similar to this may accomplish the desired end of producing acceptable venturi affect on the backside of the hydroturbine assembly 10, 65 degrees is the preferred angle of inclination.

I claim:

1. A bi-directional hydroturbine assembly for tidal deployment, comprising:
   a. a hydroturbine shroud having first and second ends and defining a shroud void;
   b. a hydroturbine positioned within the shroud void;
   c. a plurality of stabilizer fins extending radially outwardly from the hydroturbine shroud; and
   d. a plurality of pivoting deflectors pivotally connected between adjacent stabilizer fins about the hydroturbine shroud, whereby the inflow of the tidal current and the ebb of the tidal current biases one of the pivoting deflectors in a non-deflective position and biases another of the pivoting deflectors in a deflective position, respectively.

2. The bi-directional hydroturbine assembly of claim 1, wherein the stabilizer fins extend along substantially the entire distance between the first end and the second end of the hydroturbine shroud, each of the plurality of stabilizer fins having a first stabilizer fin end and a second stabilizer fin end, each of the plurality of stabilizer fins also having a first planar side and a second planar side, the respective first and second planar sides terminating at a point remote from the cylindrical hydroturbine shroud in a stabilizer fin edge, the stabilizer fin edge having a first stabilizer fin tip defined by the junction of the first stabilizer fin end and the stabilizer fin edge and a second stabilizer fin tip defined by the junction of the second stabilizer fin end and the stabilizer fin edge;
   a first pivot point at each respective stabilizer fin tip of the plurality of stabilizer fins, and a second pivot point at each respective second stabilizer fin tip of the plurality of stabilizer fins.

3. The bi-directional hydroturbine assembly of claim 1, wherein at least one of the pivoting deflectors comprises a ballast.

4. The bi-directional hydroturbine assembly of claim 1, wherein at least one of the pivoting deflectors is neutrally buoyant.

5. The bi-directional hydroturbine assembly of claim 1, wherein at least one of the pivoting deflectors is buoyant.

6. The bi-directional hydroturbine assembly of claim 1, wherein at least one of the pivoting deflectors is ballasted, at least one other pivoting deflector is neutrally buoyant, and at least one other pivoting deflector is buoyant.

7. A bi-directional hydroturbine assembly for deployment in a tidal current, comprising:
   a. a hydroturbine shroud having first and second ends and defining a shroud void;
   b. a hydroturbine positioned within the shroud void, the hydroturbine and shroud void cooperating to correspond with the direction of tidal current;
   c. a first deflector corresponding with the first end of the hydroturbine shroud, the first deflector functional to deflect water away from the hydroturbine shroud during the first direction of the tidal current; and
   d. a second deflector corresponding with the second end of the hydroturbine shroud, the second deflector functional to deflect water away from the hydroturbine shroud during the second direction of the tidal current.

8. The bi-directional turbine assembly of claim 7, wherein the first deflector comprises a plurality of first end pivoting deflectors and the second deflector comprises a plurality of second end pivoting deflectors.

9. The bi-directional hydroturbine assembly of claim 8, wherein at least one of the pivoting deflectors is ballasted, at least one other pivoting deflector is neutrally buoyant, and at least one other pivoting deflector is buoyant.

10. A bi-directional hydroturbine assembly for tidal deployment, comprising:
    a. a hydroturbine shroud having first and second ends and defining a shroud void;
    b. a hydroturbine positioned within the shroud void; and
    c. at least one deflector functional to deflect water away from the hydroturbine shroud during both directions of the tidal current.

11. The bi-directional hydroturbine assembly of claim 10, wherein the deflector comprises a plurality of first end pivoting deflectors and a plurality of second end pivoting deflectors.

12. The bi-directional hydroturbine assembly of claim 11, wherein at least one of the pivoting deflectors is ballasted, at least one other pivoting deflector is neutrally buoyant, and at least one other pivoting deflector is buoyant.

* * * * *